Aug. 6, 1929.  E. C. PFAFF  1,723,887
PULLEY CLUTCH
Filed Aug. 10, 1927  2 Sheets-Sheet 1
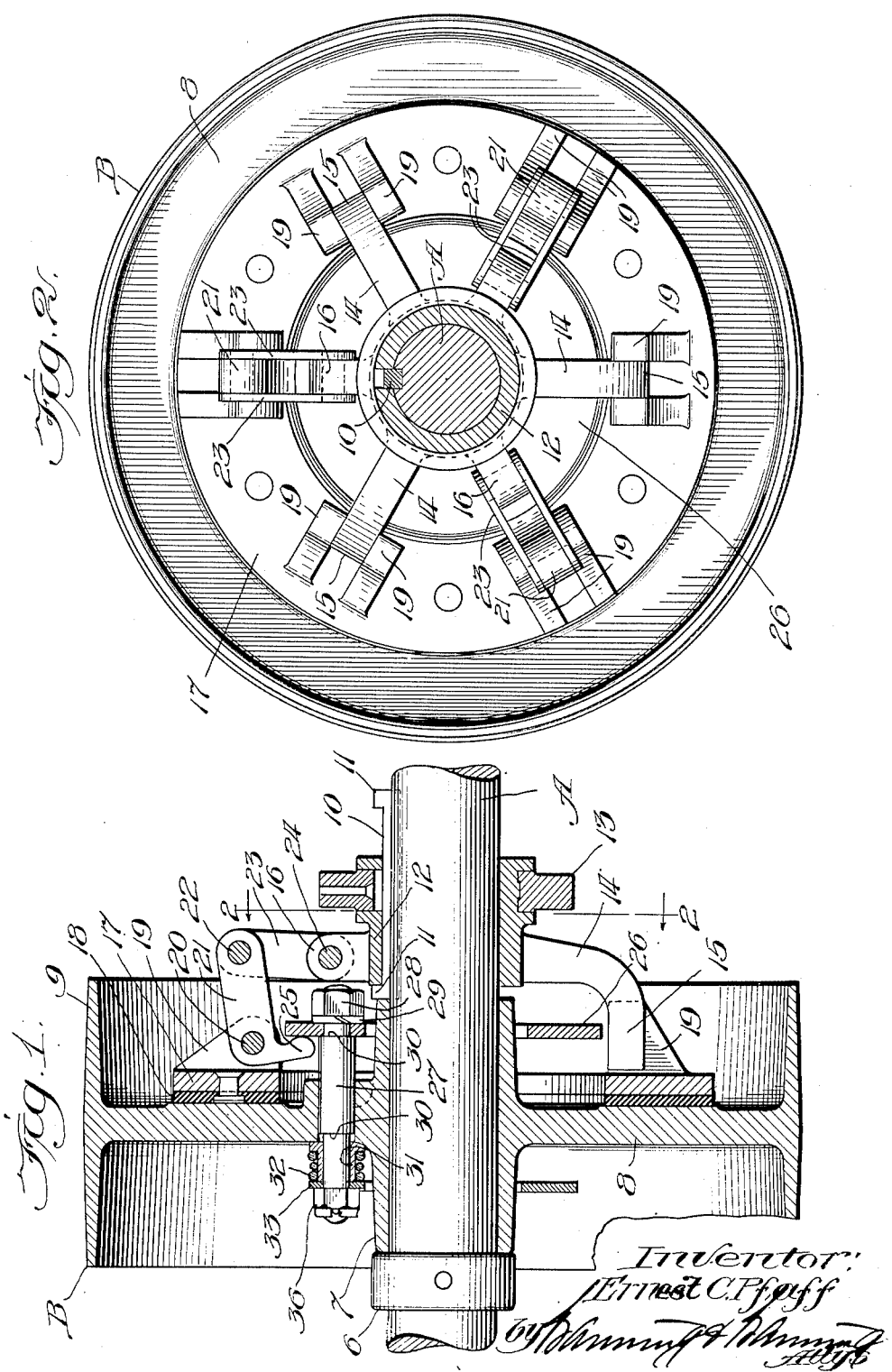

Aug. 6, 1929.  E. C. PFAFF  1,723,887
PULLEY CLUTCH
Filed Aug. 10, 1927  2 Sheets-Sheet 2
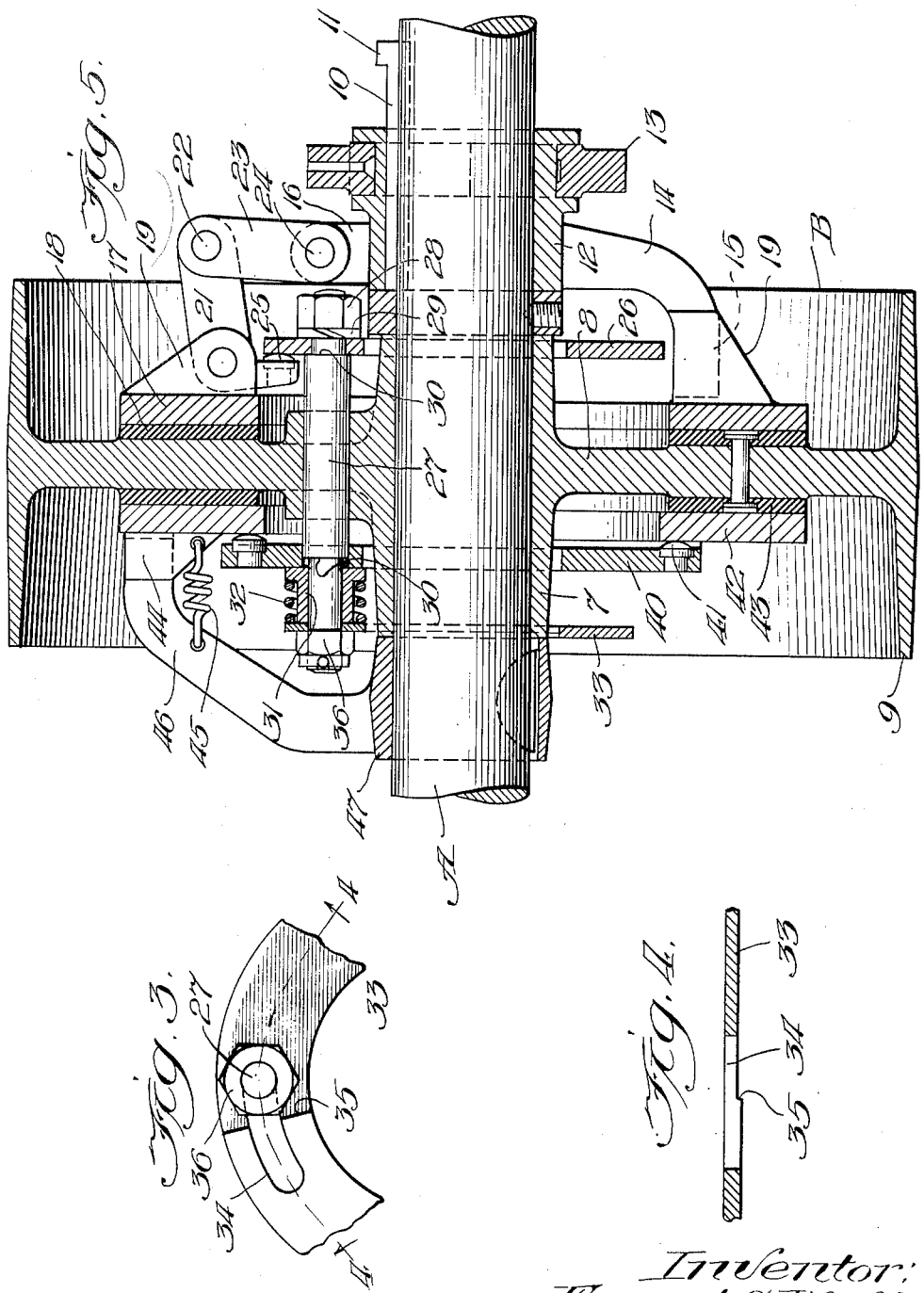
Inventor:
Ernest C. Pfaff
by Henning & Henning
Attys Patented Aug. 6, 1929.

1,723,887

UNITED STATES PATENT OFFICE

ERNEST C. PFAFF, OF CHICAGO, ILLINOIS.

PULLEY CLUTCH.

Application filed August 10, 1927. Serial No. 211,867.

This invention relates to a clutch adapted to establish a driving connection between a pulley and the shaft on which it is mounted.

For its objects my invention aims to provide a clutch mechanism which is simple, inexpensive, dependable, and otherwise advantageous, a suggestive embodiment thereof being set forth in the accompanying drawings wherein—

Figure 1 shows in elevation a driving shaft having mounted thereon a pulley and clutch mechanism which are shown in section;

Fig. 2 is a transverse section through the shaft taken on line 2—2 of Fig. 1;

Fig. 3 is a fragmentary detail of the adjusting ring;

Fig. 4 is a sectional view thereof taken on line 4—4 of Fig. 3; and

Fig. 5 which is a view similar to Fig. 1 shows a modified construction wherein the clutch members engage with opposite faces of the pulley.

The present clutch mechanism is designed for the transmissison of power from a shaft to the pulley which is mounted thereon, or vice-versa. In the description following the shaft will be referred to as the driving element and the pulley as the member which is driven, although, as above suggested, this relationship may be reversed.

The shaft A herein shown may be provided with a collar 6 providing a stop for one end of a hub 7 having a radial web 8 which carries a flange 9, the hub, web and flange forming a pulley B of conventional design. At the hub end opposite the collar 6 is a key 10 carried fast by the shaft and provided with lateral end extensions 11 forming stops. Mounted to slide non-rotatably upon the shaft between the stops of the key is a sleeve 12 having an annular groove for the reception of a trunnioned collar 13. As by means of a yoke (not shown) which is connected to the collar, the sleeve may be shifted back and forth upon the shaft within the limits of the two key stops.

From the sleeve 12 are projected radially a plurality of arms 14 each having an end 15 turned laterally toward the pulley web. The number of such arms is preferably three, as shown. A like number of lugs 16 also stand out radially from the sleeve 12 in positions which are intermediate of the arms 14. Adjacent the pulley web is positioned a friction plate 17 having its engaging face equipped, by preference, with a lining 18 which is adapted to bear against a friction face on the proximate web side. Extended from the side of the friction ring which is opposite the facing 18 are certain lugs 19 arranged in pairs, one for each lug and arm end 15. Between every other pair of lugs 19 is pivoted as at 20 a bell crank 21 having a pivotal connection 22 between a pair of links 23 which are joined pivotally at 24 to the proximate lug 16. Each bell crank 21 is provided with an acting head 25 adapted to bear against a circular thrust plate 26 which loosely surrounds the hub 7 in interposed relation to the pulley web and sleeve 12.

The several bell cranks constitute levers of the second class having the power applied at 22, the weight at 20, and the fulcrum being the thrust plate 26. In the position shown in Fig. 1, the sleeve is shifted to one extreme position so as to cause the several bell crank heads 25 to engage the thrust ring with a maximum pressure, the consequence being that the friction plate 17 is held with pressure against the pulley web. In this relationship of the parts the clutch is fully engaged.

The thrust ring is yieldably carried by a plurality of bolts 27 of which three is a suggested number. These bolts are extended through openings in the pulley web adjacent the hub 7 and each is provided at one end with a nut 28 which bears against a spring washer 29 which abuts against the thrust plate 26, as shown. The bolt is preferably enlarged through its center region so as to provide stop shoulders 30 one of which engages the rear face of the thrust plate. At the opposite bolt end is carried a flanged bushing 31 around which is coiled a compression spring 32. Adjacent the outer end of each bushing is arranged a common adjusting ring 33 having arcuate slots 34 (see Figs. 3 and 4) through which the bolt ends are extended. The ring is stepped as at 35 in the region of each slot center so as to present two thicknesses. When rotated to one extreme position, a nut 36 which is applied to each bolt end will bear against a ring portion of lesser thickness, and when shifted to the opposite position will bear against a ring portion of greater thickness.

The several nuts 36, when tightened, will serve to keep the ring from slipping. By this means I am enabled to shift the ring so as to present a portion of increased thickness whereby to compensate for wear.

A very similar construction is presented in Fig. 5 where I have shown a pulley web 8 provided with opposite clutch faces. In addition to the parts already described in connection with Figs. 1 to 4 inclusive, I utilize a second thrust ring 40 which abuts the flanged ends of the bushings 31. This thrust ring is equipped with a plurality of bearing points which may take the form of buttons 41 each in engagement with an associated friction ring 42 which engages with a lining 43 which is mounted on the side of the pulley web which is opposite to that engaged by the other friction ring 17. This second friction ring which is equipped with lugs 44 arranged in pairs is normally held in released position by means of springs 45 which extend therefrom to arms 46 each having an inturned end which is slidingly confined between the lugs. The arms 46 are extended radially from a hub 47 having a keyed mounting on the shaft A.

In operation the sleeve is shifted toward and from the hub whereby to vary the pressure of the friction ring or rings upon the pulley web. During such movements the ends 15 of the arms 14 slide between the lugs 19, these lugs serving to transmit rotary motion from the sleeve to the friction ring 17. The resulting friction is applied in a soft and gradual manner due in part to the resilient mounting of the thrust plate 26. The movements of this thrust plate are limited in one direction by the compressibility of the springs 32 and at the other by the engagement of the flanged bushing with the proximate shoulder 30. As already pointed out, the degree of this shifting movement may be regulated through adjustment of the ring 33. In the case of the double acting clutch of Fig. 5 exactly the same operation takes place with the exception that opposing pressures are applied to the pulley web. The parts forming the present invention are few and may be produced at small expense. They are durable and accessible and so designed as to perform serviceably over an extended period of time.

I claim:

1. In a clutch, the combination with a shaft on which is loosely mounted a pulley having a web provided with a friction face, a friction plate adapted to bear with a variable pressure against the friction face of the web, and means for shifting the friction plate comprising a sleeve splined to the shaft and shiftable longitudinally thereupon, radial connections, including bell cranks, between the sleeve and friction plate, a thrust plate engaged by each bell crank, and means providing for the thrust plate a resilient mounting on the pulley, substantially as described.

2. In a clutch, the combination with a shaft whereon is loosely mounted a pulley having a single friction face, a single friction plate adapted to engage the friction face of the pulley with a variable pressure, a plurality of levers of the second class pivoted to the plate, a common resilient fulcrum with which all the levers coact, and means for operating all of the levers in unison, substantially as described.

3. In a clutch, the combination with a shaft whereon is loosely mounted a pulley having a friction face, a friction plate adapted to bear with a variable pressure against the friction face of the pulley, a thrust plate having a resilient mounting on the pulley, a plurality of levers of the second class each pivoted to the friction plate and bearing against the thrust plate as a fulcrum, and means whereby all of said levers may be operated in unison, substantially as described.

4. In a clutch, the combination with a shaft whereon is loosely mounted a pulley having a friction face thereon, a thrust plate, means providing an adjustable and resilient support for the thrust plate on the pulley, a friction plate adapted to bear with a variable pressure against the friction face of the pulley, levers of the second class pivoted to the friction plate and coacting with the thrust plate as a fulcrum, and means connecting the several levers whereby the same may be operated in unison, substantially as described.

5. In a clutch, the combination with a shaft whereon is loosely mounted a webbed pulley, a single friction plate adapted to engage one face of the pulley web with a variable pressure, a sleeve splined to the shaft and shiftable longitudinally thereupon, and lever connections, including a yielding fulcrum, adapted to transmit movements from the former to the latter, substantially as described.

6. In a clutch, the combination with a shaft whereon is loosely mounted a pulley having a friction face, a friction plate adapted to engage the friction plate of the pulley with a variable pressure, means including a thrust plate for moving the friction plate toward and from the friction face of the pulley, a plurality of bolts connecting the thrust plate to the pulley, a nut on each bolt, an adjusting ring having slots through which the several bolts are extended whereby the nuts may bear against the adjustment ring, the material forming the adjusting ring being stepped to provide uneven thicknesses adjacent each slot whereby the ring when rotated in one direction will be thicker as presented to the nuts than when rotated in the opposite direction, and spring means interposed between the adjusting ring and the pulley, substantially as described.

7. In a clutch, the combination with a shaft whereon is loosely mounted a pulley having a friction face, a friction plate adapted to engage the friction face of the pulley with a variable pressure, means including a thrust plate for moving the friction plate toward and from the friction face of the pulley, and a yieldable mounting on the pulley for the thrust plate including a slotted adjusting plate, bolts extended therethrough from the thrust plate and each passing through the slots of the adjusting plate which latter part has capacity for a limited rotary movement and is stepped adjacent its slots to provide uneven thicknesses of material whereby the adjusting ring may space the adjacent parts at variable distances apart, substantially as described.

ERNEST C. PFAFF.